United States Patent [19]

Shmueli

[11] Patent Number: 4,925,709

[45] Date of Patent: May 15, 1990

[54] NET OF PLASTIC RINGS CONNECTED BY CONNECTOR MEANS

[76] Inventor: Itzhak Shmueli, Artits Villag, Ein Hod, Israel

[21] Appl. No.: 169,991

[22] Filed: Mar. 18, 1988

[51] Int. Cl.$^5$ .......................... F16B 2/00; F16B 5/07; F16B 5/10
[52] U.S. Cl. ........................ 428/33; 428/52; 428/53; 428/54; 428/57; 428/99; 428/222; 428/223
[58] Field of Search ................. 428/12, 33, 52, 53, 428/54, 57, 99, 222, 223

[56] References Cited

U.S. PATENT DOCUMENTS 3,746,602  7/1973  Caroli et al. .................. 428/52
4,229,496 10/1980  Striegel ........................ 428/53

Primary Examiner—Marion C. McCamish
Attorney, Agent, or Firm—Browdy and Neimark

[57] ABSTRACT

A net comprising a plurality of rings grooved on both sides and interconnected by "V" shaped flexible connectors, locked in to form an "O" shaped connection by a ratchet latch mechanism. The net is stretched to any desired construction and can be used for children playgrounds, or for naval security systems.

16 Claims, 2 Drawing Sheets

NET OF PLASTIC RINGS CONNECTED BY CONNECTOR MEANS

This invention relates to a net constructed from plastic rings connected to each other by plastic connectors.

The net can be used for either children's playgrounds, where it is installed in the form of a ladder or the like, whereby the children can climb or walk on the net structures.

Another use for the net is for naval security wherein the net is used to lock out free entry into a port, or securing a dockyard from intruding boats or divers or fish, such as sharks. The net in such a case will be mostly immersed in the water, and pulled across potential passages between peers, or floats.

To construct the net hereby described one uses light weight durable plastic rings, or stainless steel rings of a certain configuration as outlined below; and a specialized connector as described below having the desired properties for endurable stress, flexibility and corrosion resistance.

The net differs from nets in the prior art made of either ropes, metal wires, cables, etc. which are interconnected by weaving or knitting or knotting configurations, having vertical and horizontal components, interconnected in form of a warp and weft or other configuration.

The net provided in this invention comprises; a plurality of rings grooved on both sides, these rings being connected to each other by connectors having a "V" shaped trip with a bellied apex; each connector having two arms on the open end rounded off towards the centre to form a generally oval shaped connector, one of said arms having a tongue with a latch tooth on convex side, and a plurality of teeth on concave side of arm; and the other of said arms having a plurality of teeth on convex side in an elevated pathway, having a bridge across pathway through which said tongue is passed and secured by said latched tooth, thus forming a generally oval shaped link with a ratchet and latch closure mechanism. The resultant net can be stretched to form a desired configuration.

In the preferred embodiment connector is made of flexible plastic such as nylon 6 compounded with 3% of a suitable UV absorber, and 1% of a grey pigment. The rings are preferably made of polypropylene homopolymer such as MF-8, compounded with 1% of a foaming agent such as CLM - 70 of Boheringer, and 1% of a grey pigment.

Another embodiment is made with stainless steel connectors. The rings constructed in a form of a double "U" cross section, thus giving sufficient strength, saving plastic material, and having a shape easily attached to the oval connector. The rings used for naval security should have a high cutting strength in the order of 7 tons.

Other ring configurations were also tried, such as cylindrical rings, flat rings and other shapes.

It was found, however, that the double "U" rings had the best structure when connected with the designed connector. In the preferred embodiment of the connector the number of teeth on the arms is 7. Also a step is provided on one inner part of the longer arm, to act as a security step for the tip edge of the other arm folded towards it, when tongue is secured to bridge by latched tooth. The two sets of teeth on both arms of connector engage one with another and secure connector.

The invention can be best demonstrated by the accompanying drawings.

Figure 1:
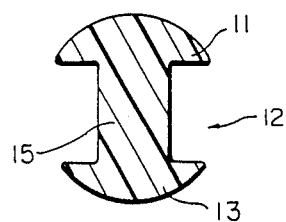
FIG. 1 illustrates a cross section of a plastic ring

FIG. 1 illustrates a cross section of ring having grooves 12 or both sides thus defining two segments 11, 13 connected by a central core 15.

Figure 2:
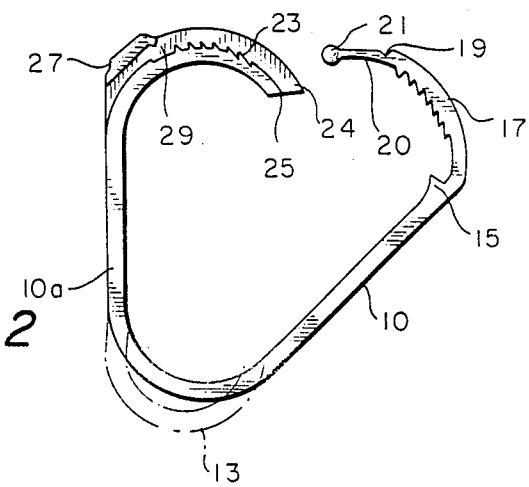
FIG. 2 illustrates a side view of the connector
Figure 3A:
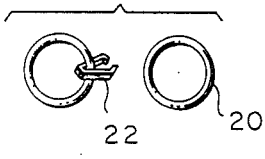
FIG. 3 illustrates a typical structure of rings secured with the connectors used for playgrounds.
Figure 3C:
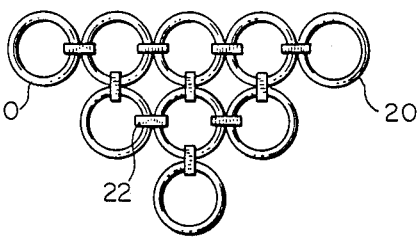
Figure 3B:
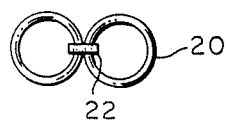
Figure 3D:
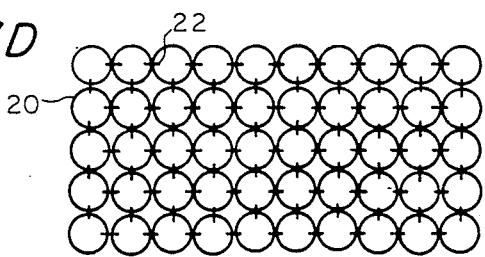
Figure 3E:
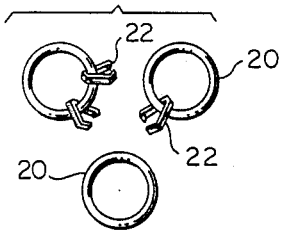
Figure 3F:
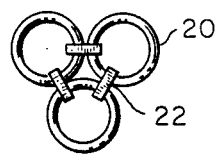
Figure 3H:
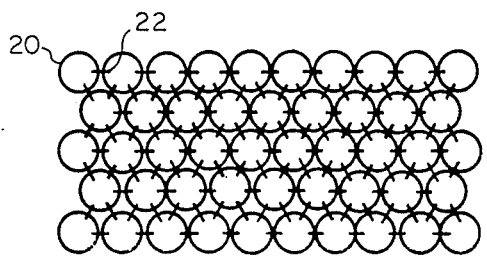
Figure 3G:
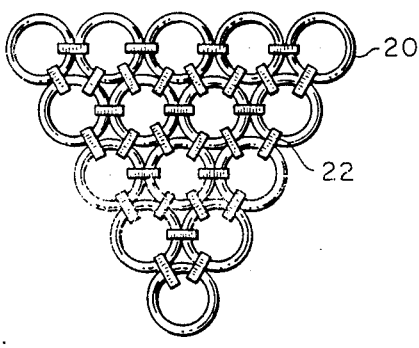

FIG. 2 illustrates a connector comprising a "V" shaped plastic strip with two legs 10 and 12, having a bellied apex 13, therebetween and the first leg 10 having a step 15 at the begining of a rounded arm 17, the rounded arm 17 having a plurality of teeth 18 on concave face, having a notch 19 and tooth 21 on outer convex tongue end 20. The second leg 10a has a rounded arm 9, with a plurality of teeth 23 built into a pathway 24. A bridge 27 is provided across pathway 24 into which tongue 20 enters and latched by tooth 21 and notch 19, the toothed arms 9 and 17 forming a ratchet latch mechanism.

FIG. 3 illustrates a ring structure having a plurality of rings 20 interconnected by a plurality of connectors 22; the ring connection is either in a straight horizontal connection, wherein each ring is connected to the next at its horizontal tangential position; or the connection is a triangular form, wherein the rings are interconnected at 60, thus forming a continuous chain of triangles connected to each other.

Figure 4:
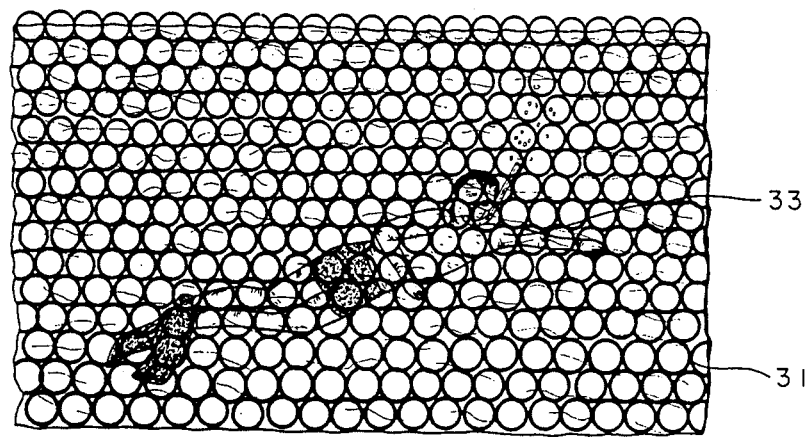
FIG. 4,5 illustrates a typical net structure for naval uses.

FIG. 4 illustrates a net 31, preventing an intruder from crossing.

Figure 5:
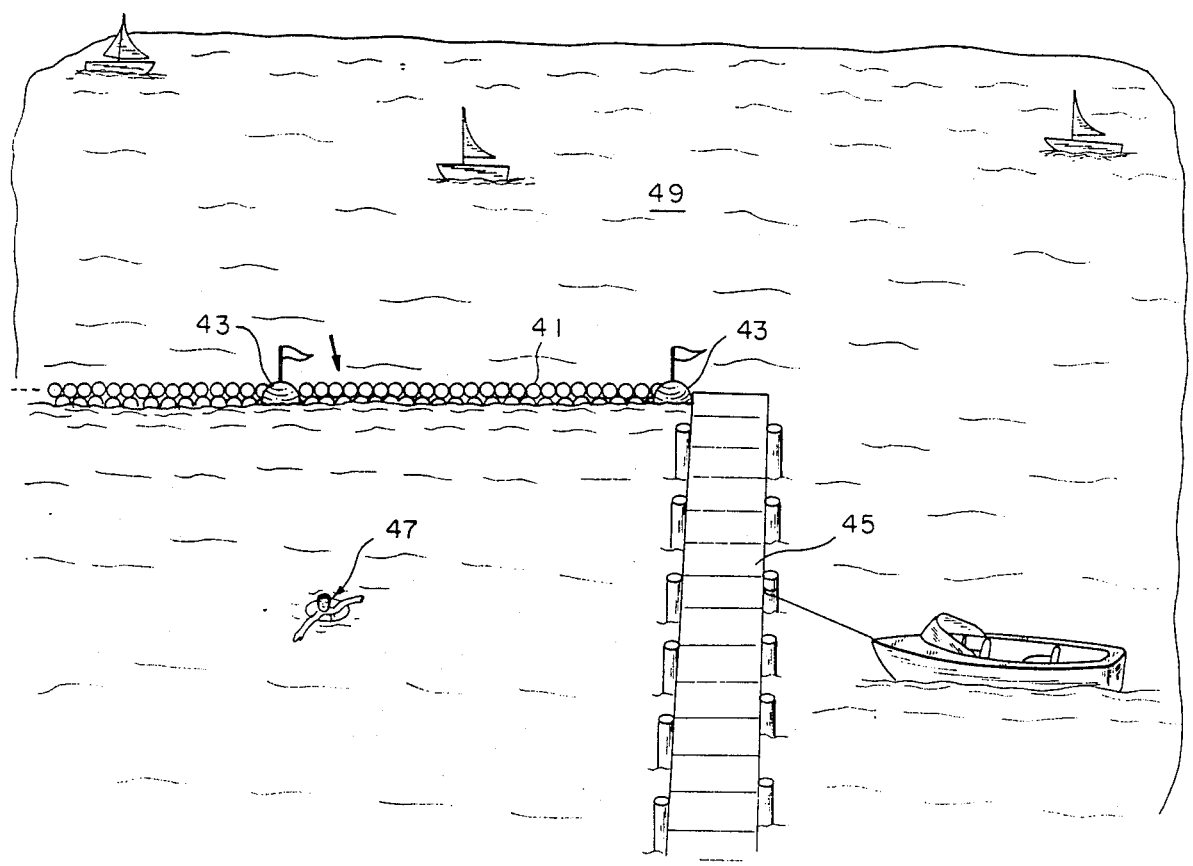

FIG. 5 illustrates a net 41 secured between floats 43 or pier 45 securing a swimming section or boat harbour illustrated by a swimmer 47 protected from any penetration from the open sea 49.

While the invention has been described with reference to the illustrations accompanied in the application, one should realize that many more combinations of net construction could be carried out by this innvention.

What is claimed:

1. A net comprising of a plurality of plastic rings connected to each other by connector means, each connector means comprising a "V" shaped strip having a ratchet latch mechanism which, when closed, forms said connector means into a generally oval shape, said net being stretched across a space.

2. A net in accordance with claim 1 wherein said rings have grooves on both sides thereof to define a cross section having two segments joined by a central core.

3. A net in accordance with claim 1 wherein said connectors are made of plastic or stainless steel.

4. A net in accordance with claim 1 provided in the form of playground equipment.

5. A net in accordance with claim 1 wherein said net in said stretched form is secured between floats, piers or the like at least partially submerged in water.

6. A net comprising a plurality of rings connected to each other by connectors having a "V" shaped strip with a bellied apex; and having two arms on the open end rounded off towards the centre, one of said arms having a tongue with a latch tooth on a convex side thereof, and a plurality of teeth on a concave side thereof; and the other of said arms having a plurality of teeth on a convex side in an elevated pathway, having a bridge across said pathway through which said tongue is passed and secured by said latched tooth, thus forming a generally oval shaped link.

7. A net as in claim 6 wherein said plurality of rings are formed of polypropylene or stainless steel.

8. A net as in claim 6 wherein the ring is made of polypropylene homopolymer foamed by a suitable foaming agent; said ring having a cutting strength of at least 7 tons.

9. A net as in claim 6 wherein the said ring design is in form of a double "U" cross section having two segments joined across by a central core.

10. A net as in claim 6 wherein said connectors are made of plastic.

11. A net as in claim 10 wherein said connectors are made of Nylon 6.

12. A net as in claim 6 wherein said connector has on said arms a set of 7 teeth on each of said arms, which engage with one another to secure connector link.

13. A net as in claim 6 wherein said connector is made of stainless steel.

14. A net as in claim 6 used for ladders and climbing means in children playgrounds.

15. A net as in claim 6 used for naval security when immersed port waters, and secured between floats, piers or the like, securing ports from intruding divers or enemy boats.

16. A net as in claim 6 used for separation of swimming sections from the open sea, securing swimmers from intrusion of sharks, speed boats and intruders.

* * * * *